United States Patent
Lacaze (10) Patent No.: US 7,460,377 B2
(45) Date of Patent: Dec. 2, 2008

(54) MATRIX CONVERTER

(75) Inventor: Alain Lacaze, Essert (FR)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/863,464

(22) Filed: Sep. 28, 2007

(65) Prior Publication Data

US 2008/0055953 A1    Mar. 6, 2008

Related U.S. Application Data

(63) Continuation of application No. PCT/EP2006/060617, filed on Mar. 10, 2006.

(30) Foreign Application Priority Data

Mar. 31, 2005   (CH) ..................... 0587/05

(51) Int. Cl.
*H02M 5/27* (2006.01)
*H02J 1/10* (2006.01)

(52) U.S. Cl. ................ 363/10; 363/65; 363/149; 363/159

(58) Field of Classification Search .......... 363/9, 363/10, 65, 136, 148, 149, 182, 159, 175; 318/123, 244, 245, 496, 800; 307/3
See application file for complete search history.

(56) References Cited

U.S. PATENT DOCUMENTS

| | | | |
|---|---|---|---|
| 5,594,636 A | 1/1997 | Schauder | |
| 5,949,672 A * | 9/1999 | Bernet | 363/159 |
| 6,519,170 B2 * | 2/2003 | Lacaze et al. | 363/152 |
| 6,771,524 B2 * | 8/2004 | Miguchi | 363/149 |
| 7,084,524 B2 * | 8/2006 | Lacaze et al. | 307/3 |
| 2004/0022081 A1 | 2/2004 | Erickson et al. | |

FOREIGN PATENT DOCUMENTS

| | | |
|---|---|---|
| DE | 10051222 | 4/2002 |
| EP | 1199794 | 4/2002 |

OTHER PUBLICATIONS

J. W. Kolar et al., "Novel Three-Phase AD-DC-AC Sparse Matrix Converter", APEC 2002, 17TH, Annual IEEE Applied Power Electronics Conference and Exposition, Dallas, TX, Mar. 10-14, 2002, Annual Applied Power Electronics Conference, New York, NY : IEE, US, vol. 2 of 2. Conf. 17, Mar. 10, 2002, pp. 777-787.

Lixiang Wei et al., "Matrix Converter Topologies With Reduced Number of Switches", 33RD, Annual IEEE Power Electronics Specialist Conference, Pesc 2002, Conference Proceedings, Cairns, Queensland, Australia, Jun. 23-27, 2002, Annual Power Electronics Specialists Conference, New York, NY: IEEE, US, vol. 2 of 4, Conf. 23, Jun. 23, 2002, pp. 57-63.

* cited by examiner

*Primary Examiner*—Gary L Laxton
(74) *Attorney, Agent, or Firm*—Darby & Darby (57) ABSTRACT

A matrix converter for converting a polyphase alternating current into a desired alternating output current includes at least two stages; a plurality of controllable bidirectional switches, converts m phases of the polyphase alternating current into alternating output current with n (n<m) phases of a load; and a controllable bidirectional switch controlling each phase of the polyphase alternating current in at least one stage of the converter.

18 Claims, 4 Drawing Sheets

MATRIX CONVERTER

This application is a continuation of International Patent Application No. PCT/EP2006/060617, filed on Mar. 10, 2006, which claims priority to Swiss Patent Application No. CH 00587/05, filed on Mar. 31, 2005. The entire disclosure of both applications is incorporated by reference herein.

The present invention relates to the field of high phase order generator equipment with power electronics. The present invention in particular relates to a matrix converter for the conversion of electrical power, which is typically connected to a generator for conversion of generated polyphase alternating current from the generator into a polyphase alternating current adapted to the grid.

BACKGROUND

In power generation, at a specified output, an increase of the rotary speed of a turbine is associated with a decrease in size and costs. Efficiency, too, can be improved. So far, power generation turbines up to 70 MW are connected to generators by way of gearing arrangements, so as to allow operation at higher turbine rotary speeds. As the output increases, the use of gearing arrangements becomes increasingly difficult due to reliability reasons. In such cases, the turbine is operated at synchronous speed.

The use of static frequency converters (power electronics) represents an alternative providing many advantages such as reduced costs of the generator in agreement with a constant product of volume and rotational speed, standardized generators for both 50 and 60 Hz, adjustable speed which allows restoration of the partial-load efficiency of the turbine, substantial reduction in noise, clean (oil-free) cooling, etc.

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Static frequency converters exist both with indirect AC/DC/AC conversion and with direct AC/AC conversion.

The indirect conversion (AC/DC/AC) is caused by generating a direct current or a directed direct voltage from the three-phase source (mains in the case of motors; generator in the case of power generation). Subsequently, the direct current or the direct voltage is converted back to an alternating current by means of an inverter. An inductance (current source converter) or a capacitor bank (voltage source converter) is switched into the intermediate circuit so as to reduce the ripple component of the current or the spikes.

Today's large direct and indirect current converters make use of thyristors. If natural commutation of the thyristors is possible, the losses in the converter are reduced. Voltage source converters use GTOs with their inherent high switching losses, as well as IGBTs or IGCTs. The power capability of the individual components is less than that of thyristors, consequently, a larger number of components are required for a specified voltage and a specified current. Voltage source converters can benefit from the use of pulse-width modulation techniques, which improve the shape of the current curves and reduce the harmonics. The higher the switching frequencies the better, except with regard to losses and dielectric fatigue. The current can largely be produced sine-shaped so that a derating of power of the electrical machine is avoided.

Direct conversion (AC/AC) is for example possible by means of a so-called cyclo-converter. Direct conversion provides significant advantages from the point of view of the electrical machine, because the current is more or less sine-shaped rather than chopped direct current. It reduces the losses, which occur additionally in the electrical machine, and it also prevents pulsating torques.

However, the use of 3-phase cyclo-converters limits the achievable frequency range to 0-⅓ of the input frequency. A 3-phase cyclo-converter is made of 3 single phase cyclo-converters, each processing ⅓ of the power in balanced operation. Exceeding the ⅓ limit in frequency ratio results in a strongly unbalanced operation. Then each single phase cyclo-converter should be designed for more than ⅓ of the full power. The over dimensioning can be up to a factor of 3 in power rating.

Another possibility of direct conversion is provided by a so-called matrix converter in which each phase of a multi-phase source (generator or mains) is connected or connectable with each phase of a multi-phase load (mains, passive load, motors, etc.) by a bi-directional switch. The switches consist of an adequate number of thyristors to withstand the differential voltage between the phases, and the phase currents, and to allow current reversal. They can be regarded as truly bi-directional components with the options of jointly using additional wiring such as snubbers or the gate unit power supplies for the drive pulses for the antiparallel components.

The switches are arranged in an (m×n)-matrix at m phases of the source and n phases of the load. This provides the option of establishing any desired connections between the input phases and the output phases. However at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses that arise from forced commutation still remain. Furthermore, the possible forced commutation necessitates the use, in all positions on the matrix, of components that can be switched off. This considerably increases the switching expenditure.

However, it is possible to operate a matrix converter in a way that only natural commutations are being used. This can be achieved by only allowing the switching over from a selected connected phase of the generator to a selected not connected phase of the generator only if certain conditions are met. Such a matrix converter as well as a mode of its operation has been disclosed in DE-A-10051222 as well as in the corresponding European application EP-A-1199794. While being of high efficiency and versatility, the concept of a matrix converter and its mode of operation generally suffer from weaknesses for certain applications with respect to harmonic distortion and with respect to possible frequency ratios.

SUMMARY OF THE INVENTION

An object of the present invention is to provide an improved matrix converter for the conversion of polyphase alternating current/voltage e.g. provided by a generator into a desired alternating output current/voltage. This in the field of a matrix converter converting a polyphase alternating current into a desired alternating output current, wherein m phases of the polyphase alternating current are converted into alternating output current with n (n<m) phases of a load by means of a multiple number of controllable bidirectional switches.

The present invention provides a matrix converter comprising at least two stages, wherein preferably in at least one stage of the converter each phase of the polyphase alternating current is controlled by a controllable bidirectional switch.

Typically, this stage is the first stage of the converter and is directly connected to a generator. By virtue of this first stage of the converter, the number of necessary bidirectional switches can be substantially reduced.

In a matrix converter according to the state-of-the-art as for example outlined in EP-A-1199794 the number of bidirectional switches is m×n. Due to the fact that such matrix converter generally has to be able to withstand high power (typically networks are in the range of 5-15 kV), additionally each of the bidirectional switches comprises several switching elements in series. This in particular in combination with high phase order generators leads to excessive numbers of necessary switching elements, thus increasing the costs associated with the matrix converter.

The proposed multi-stage matrix converter simplifies the design and reduces the number of necessary switching elements in that the piles of switching elements (for example thyristors, but also correspondingly arranged IGBT's, IGCT's, or GTO's are possible) is split and part of it is combined in the first stage of the converter. This first stage then does not necessitate to provide a full set of switching elements in series in each of the m×n pathways between the input and the output, but it is sufficient to provide part of the switching elements in each of the polyphase alternating current paths which serves as input of this first stage.

The possible reduction in number of elements is for example given as follows: if the number of switching elements in series is split in two when compared with an architecture according to the state-of-the-art, and if k switching elements are provided in series in each bidirectional switch to withstand the voltage, only k/2×m×n switching elements will remain in the second stage, while the first stage comprises k/2×m switching elements. This leads to a total number of k/2×m×(n+1) while according to the state-of-the-art k×m×n switching elements are necessary. The savings in costs as well as in necessary control equipment like snubbers and the like as well as redundancy are therefore substantial and the simplification is in addition leading to a simplified control scheme for switching of the matrix converter.

With respect to the rating of the switching elements, it has to be borne in mind that the maximum line-to-line voltage has to be withstood by one bidirectional switch in the second stage.

But not only on the input side of the matrix converter simplifications are possible, also within the second stage substantial reductions in elements is possible leading to similar advantages as given above. According to a preferred embodiment it is for example possible to join groups of switching elements within the second stage in a manner matched to the number of output phases. If for example m is an integer multiple of n it is possible to provide in at least one stage, typically in the second stage of the converter, m/n groups of controllable bidirectional switches, each group comprising n parallel bidirectional switches individually connected to each of the phases of the alternating output current. This second stage is advantageously the last stage of the converter and is directly connected to a transformer or a load.

It has to be pointed out that the design of this second stage does not necessarily depend on the design of the first stage as outlined above. As a matter of fact, this second stage is also an inventive concept independent of the above first stage.

According to an embodiment of the present invention, the matrix converter is therefore characterized in that m is an integer multiple of n, and in that the converter comprises two stages. The stage of the converter in which each phase of the polyphase alternating current is controlled by a controllable bidirectional switch is the first stage and directly connected to a generator. The second stage of the converter comprises m/n groups of controllable bidirectional switches, each group comprising n parallel bidirectional switches individually connected to each of the phases of the alternating output current. Said second stage is directly connected to a transformer or a load. Preferentially, from the generator-side m phases are forming the input of the first stage, and m/n phases are forming the output of the first stage. The two stages are preferably connected in that groups of n output phases (preferably adjacent phases when considering the relative circumferential arrangement of stator slots of the generator) of the first stage are connected or joined. On the other hand, each of the thus formed m/n conductors is connected with each of the bidirectional switches of a corresponding group of the second stage of the converter. In such a set-up, the second stage only comprises k/2×m/n×n=k/2×m bidirectional switches and not, as in the case given above, k/2×m×n. The reductions in number of switching elements are therefore even more substantial in this architecture.

The total number of bidirectional switches is then k×m instead of k×m×n (initially) or k×m×(n+1)/2 (when only the first stage is modified).

In a more general way, a pile of k switching elements can be split into two piles having $k_1$ and $k_2$ elements ($k_1+k_2=k$). The first stage of the converter would be formed of p groups of q phases (p×q=m). Each of the p group would be formed of a pile of $k_1$ switching elements connecting q phases to one of the switching groups of the second stage. The number of switching elements of the first stage is $k_1$×p×q (instead of $k_1$×p×q×n).

The second stage of the converter is then formed of q groups of n switching piles, each pile containing $k_2$ switching elements in series. Each pile connects one of the p groups of the first stage to one of the n load phases.

The number of switching elements of the second stage is $k_2$×p×n (instead of $k_2$×p×q×n).

The total number of switching elements is therefore p×(q× $k_1$+n×$k_2$) instead of p×q×($k_1$+$k_2$)×n. The reduction is a factor n (number of load phases) on the first stage and a factor q on the second stage.

This substantial saving might be limited by duty cycle considerations.

In general one can say that in any case m>2 and n>1, preferably m>3 and n>2. In the latter case, in order to be able to efficiently operate the matrix converter, the number of groups in the second stage should at least be n+1 (equivalent to 90°). Preferably the number of groups in the second stage should be at least 6 (equivalent to a relative phase difference of 60°).

According to another embodiment of the present invention, this architecture is applied in the field of high phase order generators. Therefore, advantageously the polyphase alternating current has seven or more phases.

Using a so-called high phase order generator and the corresponding high number of phases of the polyphase alternating current, leads to reductions in harmonic distortions. The main arguments, which should be considered to optimize the number of phases of the polyphase alternating current, are:

The phase number should preferably be a multiple of 3, otherwise the currents and voltages are permanently unbalanced.

A large number of phases of the polyphase alternating current leads to a high commutation frequency A high commutation frequency reduces harmonic distortion The commutation frequency is limited because of the duration of commutations.

The total number of switches is proportional to the number of phases. The cost of the converter depends directly on it.

A large number of phases means a very low duty cycle in the m-phase source. The utilization of the generator is then poor and its costs are high.

In addition it proves to be advantageous to use a generator the windings of the stator of which giving rise to the phases of the polyphase alternating current are delta connected. It is for example possible to use a polygonal stator as obtained by connecting the external winding connections and by connecting the inputs of the matrix converter to the extremity of volutes. In these polygonal stator windings, the individual windings are appropriately connected in series, the connecting points forming m vertices, each vertex defining a phase that is then connected with the input of the first stage of the matrix converter. Therefore, standard generators can be modified in order to be operated accordingly. This can be achieved in that, provided that the winding pitch can be adapted, to obtain a polygonal stator, i.e. for example by connecting the external winding connections and by connecting the inputs of the first stage of the matrix converter to the extremity of the volutes. The circular rings, which connect coils to terminals, are therefore removed and the bars ends, which were connected to the circular rings, are welded together. The stator winding therefore becomes fully symmetrical and forms one single short-circuited coil.

A very compact and efficient architecture is possible if in particular the first stage of the converter is integrated into the stator of the generator. In order to additionally improve the thermal conditions within the generator it is possible to provide the part of the matrix converter, which is contained in the stator in the stream of cooling fluid, that is used to cool the generator.

The present invention is not confined to particular numbers of desired alternating output currents. Typically however, the desired alternating output current will have 3 or 6 phases. In addition, the present invention is not particularly confined to high phase order generators. Typically however the polyphase alternating current will have more than 8 phases, and preferably the number of phases of the polyphase alternating current will be a multiple of 3. The polyphase alternating current preferably has 9, 12, 15, 18, 21 or 24 or more phases. For practical reasons the number of phases of the polyphase alternating current advantageously equals the number of stator slots.

For proper control of the matrix converter the bidirectional switches are normally controlled by a control unit, selectably connecting m inputs with n outputs, wherein first means for determining the signs of the currents in the inputs, and second means for determining the signs of the voltages between the inputs are provided, and wherein the first and second means are in active connection with the control system. The bidirectional switches are thereby connected to the control system via a signal line by way of which information concerning the switch state of the switches is transmitted to the control system.

Any method to operate a matrix converter inherently produces requests to connect selected input phases to selected output phases.

The second stage of the presented converter can be operated with a sequence of commutation as defined and known for a single stage matrix converter. The only point is to check if commutations are requested inside the first stage group or from one group to another one. In the first case no commutation has to be requested on the second stage, while in the second case the commutation request should be applied.

The first stage only receives the information regarding the generator phases, which should be connected, and the direction of conduction.

Further embodiments of the present invention are outlined in the dependent claims.

SHORT DESCRIPTION OF THE FIGURES

In the accompanying drawings preferred embodiments of the invention are shown in which:

FIG. 2a) is a schematic display of a high phase order active generator matrix converter; b) is a schematic display of a group of three bidirectional switches;

DETAILED DESCRIPTION OF THE PREFERRED EMBODIMENTS

Figure 1:
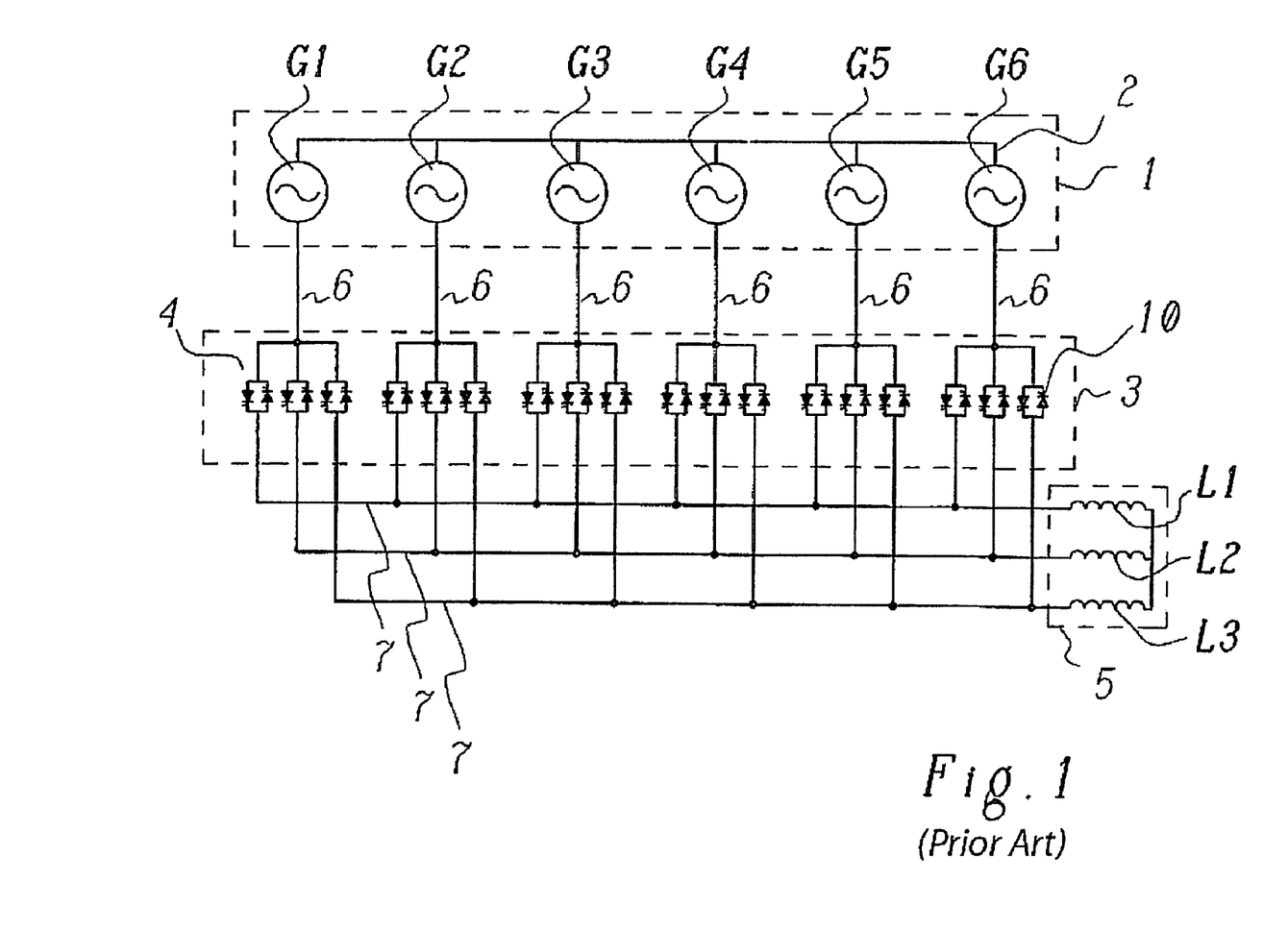
FIG. 1 is a schematic display of an active generator matrix converter according to the state-of-the-art.

Referring to the drawings, which are for the purpose of illustrating the present preferred embodiments of the invention and not at all for the purpose of limiting the same, FIG. 1 shows a generator set-up, in which a generator 1 with six generator phases G1 to G6, which are star connected (reference numeral 2), is connected to a matrix converter 3. A polyphase alternating current 6 comprising six phases (m=6) therefore gives the input of the matrix converter 3. Each of these phases is individually connected via a bidirectional switch 4 to any of the three alternating output current phases 7. This arrangement of the bidirectional switches 4 leads to a 6×3 matrix of switches, or more generally, for m phases of the polyphase alternating current 6 and for n phases of the alternating output current 7, the matrix converter comprises an m×n matrix of bidirectional switches 4. By means of corresponding controls it is therefore possible to, at any time, connect any input phase with any output phase depending on which output pattern is desired for the alternating output current 7. The alternating output current 7 is normally connected to a grid (phases L1, . . . , L3) by means of transformer 5.

A matrix converter according to FIG. 1 and a preferred mode of operation of such a matrix converter is disclosed in DE-A-10051222 as well as in the corresponding European application EP-A-1199794.

Figures 2A, 2B:
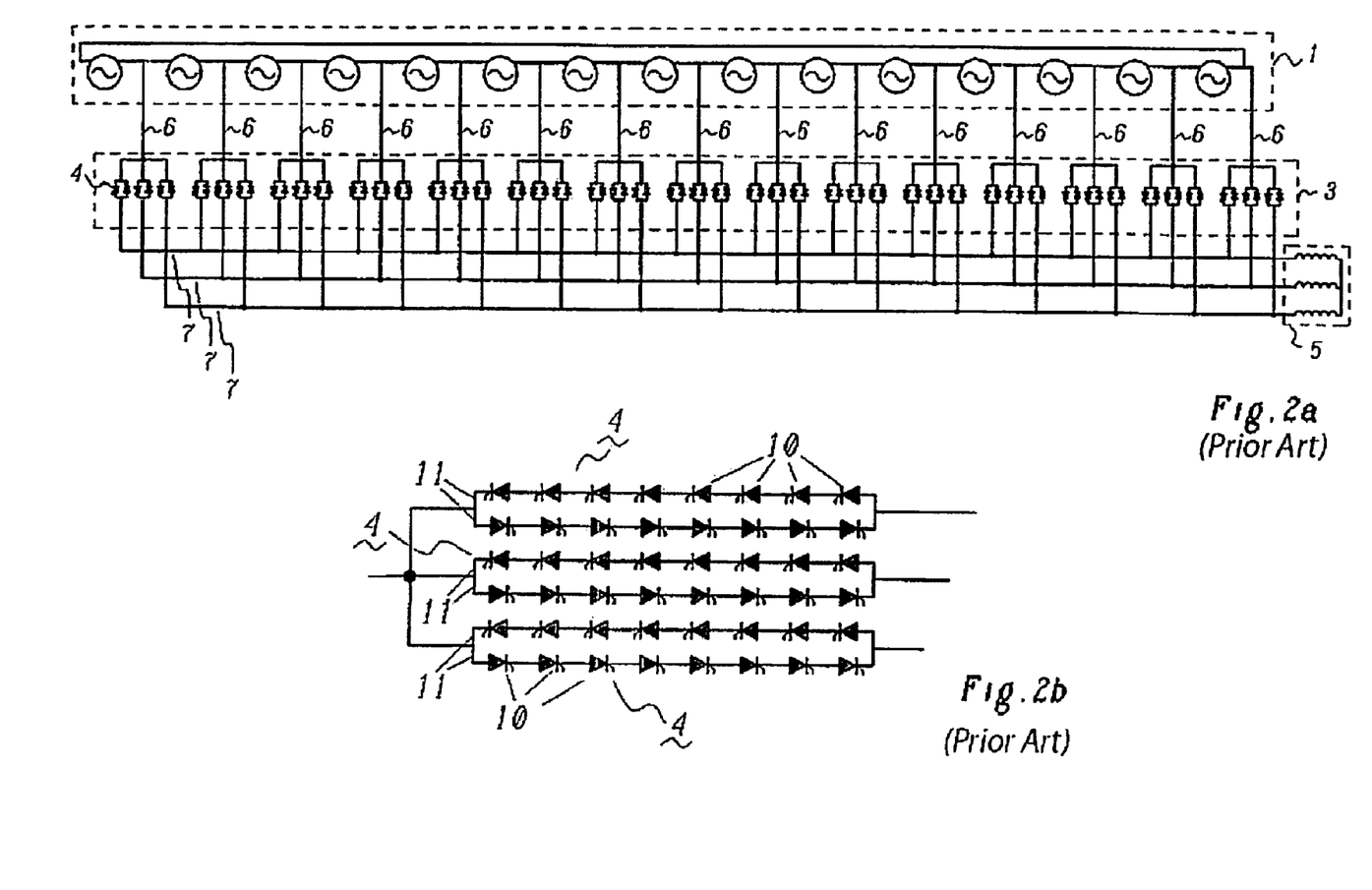

For many concerns, like harmonic distortion or frequency ratio, it would be preferable to use numerous phases, much more than the 6 shown in FIG. 1. A large number of phases might however result in a poor utilization of both the stator winding and the power switches. In addition the design according to FIG. 2 implies the use of a large number of switching elements, thus leading to high investment costs, which on the one hand are related to the switching elements but are also related to the large number of necessary means for controlling these switching elements.

There is a way around for the utilization of the generator stator, which is to consider a polygonal stator. A polygonal winding is conveniently obtained by connecting the external winding connections. Then the switches should simply be connected to the extremity of volutes. In principle the number of phase can be as high as the number of stator slots (i.e. several tens).

The output can be either 3 or 6 phase. If a 3 phase connection is used then the winding pitch cannot be reduced as usual, which might put some distortion on the no load voltage, and the effective voltage is reduced (the winding coefficient is reduced). The specific output power is slightly reduced and the generator should be oversized (ca 15%). If a 6 phase output is used then the output power is exactly the same as with the original winding. The penalty is now on the bus-bars and on the step-up transformer. A special design of bus-bars allows to substantially reduce the additional cost. The additional cost on the step-up transformer for a double winding is marginal. A 6 phase output is very attractive when the line current is large and exceeds the thyristor rating.

FIG. 2a correspondingly shows a possible setup with a high phase order generator 1 with 15 phases. The architecture described here aims at providing an attractive solution when the phase number becomes large, e.g. 24, 36 or more. Indeed the solution can be applied to any phase number. The architecture is explained in the case of a m-phase generator connected by the matrix converter to a 3 phase network. Indeed different configurations are also envisaged, e.g. a 3-phase network feeding an m-phase motor or a double winding (6-phase) transformer feeding an m-phase motor.

The generator configuration as given for 15 phases of the polyphase alternating current 6 and 3 phases of the desired alternating output current 7 is very similar to a state-of art standard synchronous AC generator. The discrepancy lies on the stator bars end-winding connections, which must be modified.

First, the circular rings that connect coils to terminals are removed. The bars ends that were connected to the circular rings are now welded together, as any bar that form the coils. By doing so, the stator winding is fully symmetrical, and forms one single short-circuited coil. Second, some or possibly all the welded connections are connected to a bidirectional switch 4. The resulting apparent phase number m of the polyphase alternating current could be 3, 4, 5, 6 . . . up to the number of bars, i.e. twice the number of slots if both the driven and non-driven end are equipped with switches. Usually AC generators are star connected, in this case the generator is delta connected. The stator configuration has some similarity with the rotor winding of a DC motor.

The basic principle of operation in such a setup remains the same, applied with a very large number of phases.

As a result of the large number of phase the apparent commutation frequency will be high. The generated harmonics on voltage will be higher in frequency and less in amplitude. The corresponding harmonic current will be further reduced because of the phase inductance of the generator.

However, if such a high phase order generator has to be connected to load, the use of a matrix converter leads to an excessive number of switching elements that are necessary. Costs as well as dimensions will therefore dramatically increase if the number of phases is increased. As a matter of fact, each of the bidirectional switching elements, as displayed in FIG. 2b) typically is composed of a pile of individual thyristors. For instance for an 11 kV network one needs 8 thyristors 10 in series in each branch 11 of each bidirectional switch 4. In case of a 15 phase input and a three phase output this leads to 720 (8×2×m×n) thyristors (or equivalent controllable switching elements), which are necessary for realizing such a matrix converter.

Figure 3:
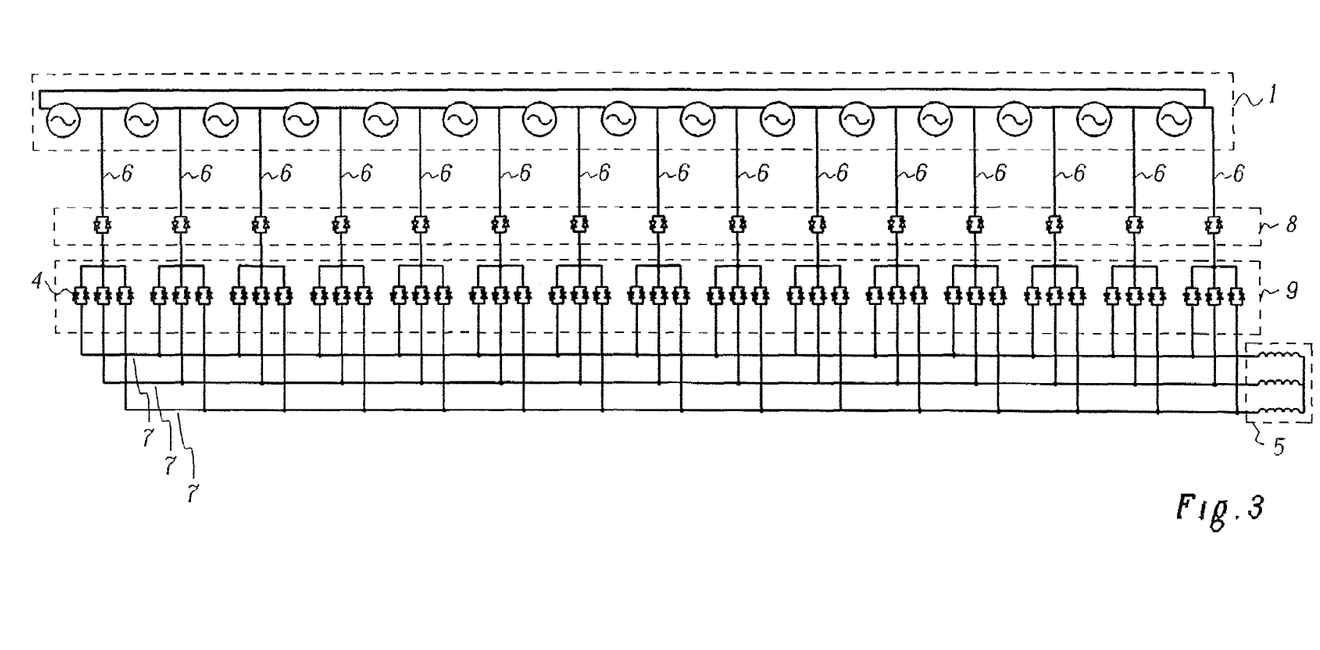
FIG. 3 is a schematic display of a high phase order active generator matrix converter with two stages.

According to the present invention is now possible to split of those thyristor piles into two parts, as shown in FIG. 3. Thus a first stage 8 of the converter is generated, in which each of the input phases 6 is provided with an individual bidirectional switching element 4. The benefit of this design is that the number of thyristors is for example 30% less than would normally result from the change from 6 to 15 phase, i.e. the increase is only 70% instead of 150%. This holds true if the pile of thyristors is split in two and one half remains in the m×n matrix indicated with the reference 3 and the other half (i.e. 4 thyristors in series for each branch of each bidirectional switch) is put into the second stage 9 of the converter. The saving is obviously even larger for a six phase output.

However, this is not the only reduction that is possible in such a setup. Additionally, the output switches can also be shared leading to an architecture as given in FIG. 4. The output switches which belong to the second stage 9 of the matrix converter are grouped into m/n groups 12 (in the specific example as given in FIG. 4 this leads to 5 groups 12), wherein each of these groups 12 comprises a number of bidirectional switches that equals the number of output phases 7 (in the specific example as given in FIG. 4 this means three bidirectional switches per group 12), wherein these bidirectional switches 4 are individually connected to the corresponding output phase 7.

Figure 4:
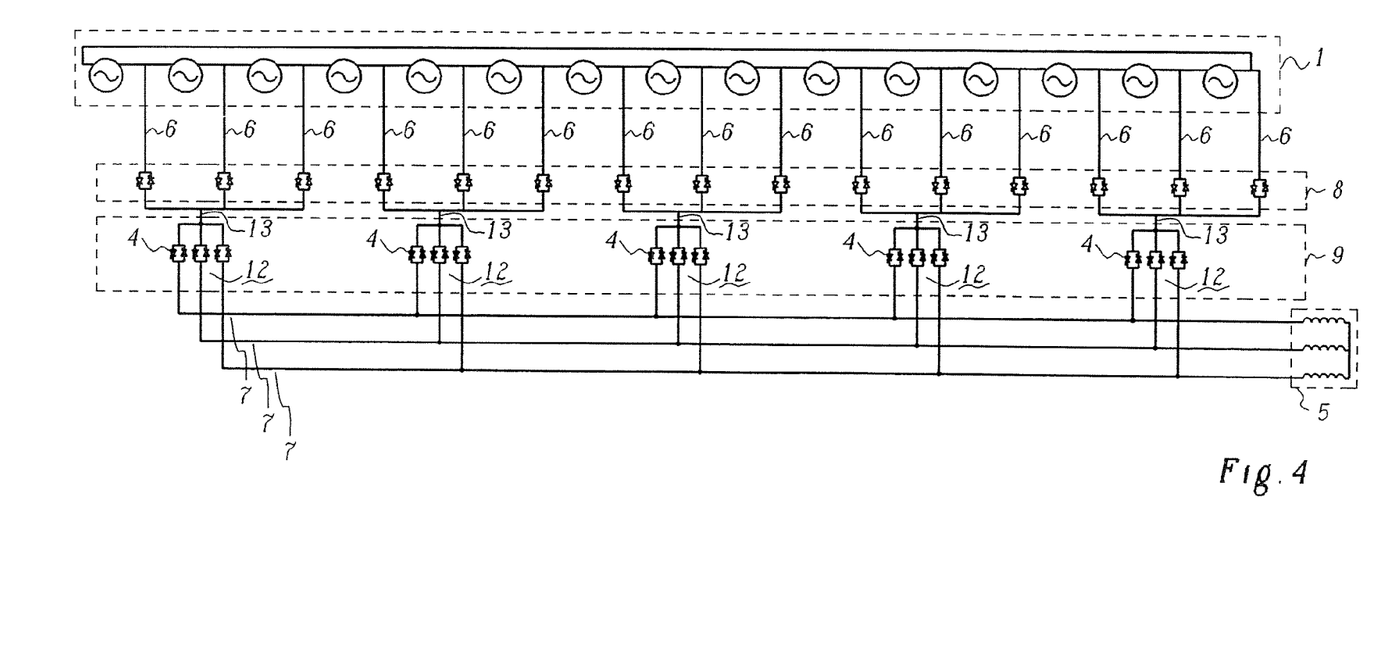
FIG. 4 is a schematic display of another high phase order active generator matrix converter with two stages.

The first stage 8 is connected with the 2nd stage 9 in that m circumferentially neighbouring input phases of the stator of the generator are joined on their non-generator side to form single conductors 13. In this setup therefore the number of input phases 6 has to be in integer multiple of the number of output phases 7. In the present case where there is 15 input phases and 3 output phases, this leads to five conductors 13 which can then be connected to the input of the groups 12 in the second stage of the matrix converter as detailed above.

Surprisingly, the proposed architecture as given in FIG. 4 leads to a matrix converter with 15 phases and correspondingly lower high order harmonics but with 16% less thyristors than the original six phase set up as given in FIG. 1.

An interesting outcome of this proposed advanced concept, with the very large number of phase, is the possibility to use a limited number, e.g. 10%, of turned-off elements like GTO's. The benefit can be first to get rid of the problem of turn-off time, second to be able to counteract against the remaining harmonic distortion.

"Valves", i.e. bidirectional switches (thyristors, IGBT, IGCT, GTO . . . ) are still numerous. The new concept gives a large flexibility to optimize the individual "valve" rating and cost. The point is that the "valves" will permanently be used in pulsed operation.

Pulsed operation allows to have rather large currents but with a low duty cycle, which exactly fits to the foreseen application.

As already mentioned above, any method to operate a matrix converter inherently produces requests to connect selected input phases to selected output phases. The second stage of the presented converter can be operated with a sequence of commutation as defined and known for a single stage matrix converter. Possible is for example an operation as described in DE 10051222.4.

The only point is to check
if commutations are requested inside the first stage group, then no commutation has to be requested on the second stage, or if commutations are requested from one group to another one, then the commutation request should be applied.

The first stage only receives the information regarding the generator phases, which should be connected, and the direction of conduction.

Concept Evaluation for Large Set-Ups

The purpose here is to sketch out what could be the generator/converter configuration and performances for a large set-up.

With the purpose of deriving orders of magnitude and to identify key factors it is sufficient to consider the following "specification" for the generator:

P=45 MW, S=55 MVA
Un=11 kV, In=3 kA

In the next section the reasoning is explained for the single stage converter. Some Figures are given for both single stage and 2 stage converter.

Reverse Voltage on Switches

The worst case reverse voltage arises when a switch is fused and all others are off. In this case the maximum voltage across one switch, Vth, is:

$$Vth = \text{sqrt}(2)(Un + 2*Vg) \approx 3.5 Un$$

In this equation Vg is the generator electromotive force per phase, and Un is the grid voltage.

For 11 kV one needs Ns=8 thyristors in series per switch. For the two stage converter one needs 4 thyristors on the generator side (first stage 8) and 4 on the network side (second stage 9).

Conduction Loss Power Evaluation

The loss power in the converter is due to 3 contributions:
Conduction losses
Commutation losses
Snubber losses Conduction is a substantial part of the total loss power and can be coarsely evaluated for a threshold voltage of 1 V, and a slope resistance of 0.16 mΩ.

Generally one can say that the present invention allows to benefit from the advantage of using a high number of phases from the generator side, which as a rule is leading to lower amplitudes and higher frequencies of unwanted harmonics. This is due to the fact that the usual drawback of necessitating a large number of switching elements can be avoided.

What is claimed is:

1. A matrix converter for converting a polyphase alternating current into a desired output alternating current, the matrix converter comprising:
   at least a first stage and a second stage;
   the at least first stage and second stage including a plurality of controllable bidirectional switches, which converts m input phases of the polyphase alternating current into the output alternating current with n phases, wherein m represents a number of phases of the polyphase alternating current and n represents a number of phases of the output alternating current, n>1, m>2 and m is an integer multiple of n;
   wherein m number of the plurality of controllable bidirectional switches are disposed in the first stage of the converter, each controllable bidirectional switch controlling a respective phase of the polyphase alternating current, and wherein the first stage is connected directly to a generator;
   wherein m/n groups of controllable bidirectional switches are disposed in the second stage of the converter, each group having n number of the plurality of controllable bidirectional switches connected in parallel, each switch being individually connected to a respective one of the n phases of the output alternating current; and
   wherein each controllable bidirectional switch further comprises a plurality of switching elements disposed in series as a stack in each bidirectional switch so as to be able to withstand a voltage, wherein p represents a number of groups controllable bidirectional switches disposed in the first stage, and each group of controllable bidirectional switches disposed in the first stage is comprised of k1 switching elements, and q represents a number of groups of controllable bidirectional switches disposed in the second stage, and each group of controllable bidirectional switches disposed in the second stage is comprised of n switch stacks, each switch stack being comprised of k2 switching elements in series, wherein p*q=m and each of the p groups of a stack being formed by k1 switching elements connects to one of the switching groups of the second stage, and wherein each switch stack of the second stage of the converter connects one of the p groups of the first stage to one of the n phases of the output alternating current.

2. The matrix converter as recited in claim 1, wherein the second stage of the converter is a last stage of the converter and directly connected to one of a transformer and a load.

3. The matrix converter as recited in claim 1, wherein the converter receives from the generator the polyphase alternating current having m phases, forming an input of the first stage, wherein m/n phases form an output of the first stage, wherein each m/n phase of the output of the first stage is comprised of groups of n output phases, and wherein the groups of n output phases are connected to form each m/n phase of the output of the first stage, and each of the m/n phases is connected to one of the group of controllable bidirectional switches of the second stage of the converter.

4. The matrix converter as recited in claim 3, wherein each of the groups of n output phases of the first stage are disposed to be substantially adjacent to each other.

5. The matrix converter as recited in claim 1, wherein each bidirectional switch includes at least two branches with antiparallel unidirectional switching elements, each branch including at least two switching elements in series.

6. The matrix converter as recited in claim 1, wherein the polyphase alternating current is provided by a generator for production of electrical power from mechanical power, and wherein the polyphase alternating current has more than three phases.

7. The matrix converter as recited in claim 6, wherein the generator includes a rotor and a stator, and wherein the windings of the stator giving rise to the phases of the polyphase alternating current are delta connected.

8. The matrix converter as recited in claim 6, wherein the first stage of the converter is integrated into the stator of the generator.

9. The matrix converter as recited in claim 8, wherein a part of the matrix converter disposed in the stator is located in a flow of cooling fluid that is used to cool the generator.

10. The matrix converter as recited in claim 1, wherein the desired alternating output current has three or six phases n, and wherein the polyphase alternating current has more than eight phases m.

11. The matrix converter as recited in claim 10, wherein the number of phases of the polyphase alternating current is a multiple of three.

12. The matrix converter as recited in claim 11, wherein the polyphase alternating current has nine, twelve, fifteen, eighteen, twenty-one, or twenty-four phases.

13. The matrix converter as recited in claim 1, further comprising a control unit controlling the plurality of controllable bidirectional switches so as to selectably connect the m inputs with the n outputs, a first means for determining signs of the phases of the polyphase alternating current in them inputs, and second means for determining the signs of voltages between the m inputs, wherein the first and second means are in active connection with the control unit.

14. The matrix converter as recited in claim 13 further comprising a signal conductor connecting the plurality of controllable bidirectional switches to the control unit, and wherein information concerning a switch state of the switches is transmitted to the control unit over the signal conductor.

15. The matrix converter as recited in claim 1, wherein the bidirectional switches include antiparallel-switched thyristors.

16. The matrix converter as recited in claim 1, wherein the bidirectional switches include correspondingly arranged IGBT's, IGCT's, or GTO's.

17. The matrix converter as recited in claim 1, wherein the number of phases m of the polyphase alternating current equals a number of stator slots in a generator providing the polyphase alternating current.

18. A method for converting a polyphase alternating current into a desired alternating output current using a matrix converter having at least a first stage and a second stage, the method comprising:
  converting m phases of the polyphase alternating current into the alternating output current with n (n<m) phases using a plurality of controllable bidirectional switches arranged into groups, wherein m represents a number of phases of the polyphase alternating current and n represents a number of phases of the alternating output current;
  controlling each phase of the polyphase alternating current in at least one of the first stage and the second stage of the converter using at least one of the plurality of controllable bidirectional switch;
  wherein, if commutations are requested inside the first stage group, then no commutation is requested on the second stage, and
  if commutations are requested from one group to another one, then the commutation request is applied on the second stage.

\* \* \* \* \*